United States Patent
Tsai et al.

(10) Patent No.: US 11,025,457 B2
(45) Date of Patent: Jun. 1, 2021

(54) ENHANCEMENTS ON QCL FRAMEWORKS FOR MULTIPLE TRP OPERATION

(71) Applicant: MEDIATEK INC., Hsinchu (TW)

(72) Inventors: Cheng-Rung Tsai, Hsinchu (TW); Chia-Hao Yu, Hsinchu (TW); Weidong Yang, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/582,423

(22) Filed: Sep. 25, 2019

(65) Prior Publication Data
US 2020/0107352 A1 Apr. 2, 2020

Related U.S. Application Data

(60) Provisional application No. 62/737,247, filed on Sep. 27, 2018.

(51) Int. Cl.
*H04L 27/26* (2006.01)
*H04W 48/12* (2009.01)
(Continued)

(52) U.S. Cl.
CPC ....... *H04L 25/0226* (2013.01); *H04B 7/0408* (2013.01); *H04B 7/0617* (2013.01);
(Continued)

(58) Field of Classification Search
CPC . H04L 41/0806; H04L 5/0046; H04B 7/0602; H04B 7/088; H04B 7/0408
(Continued)

(56) References Cited

U.S. PATENT DOCUMENTS

| 2007/0098006 A1* | 5/2007 | Parry | H04L 45/245 370/437 |
|---|---|---|---|
| 2013/0089089 A1* | 4/2013 | Kamath | H04L 12/413 370/358 |

(Continued)

FOREIGN PATENT DOCUMENTS

| CN | 108024365 A | 5/2018 |
|---|---|---|
| CN | 108260217 A | 7/2018 |

(Continued)

OTHER PUBLICATIONS

International Search Report and Written Opinion dated Dec. 27, 2019 in PCT/CN2019/108373, 8 pages.
(Continued)

*Primary Examiner* — Asad M Nawaz
*Assistant Examiner* — Jason A Harley
(74) *Attorney, Agent, or Firm* — Oblon, McClelland, Maier & Neustadt, L.L.P.

(57) ABSTRACT

Aspects of the disclosure provide a user equipment (UE). The UE receives configuration information of multiple transmission configuration indication (TCI) states. The UE receives one or more activation commands that associate a first subset of the TCI states with one or more codepoints of a TCI field and a second subset of the TCI states with the one or more codepoints of the TCI field. The UE receives a codepoint associated with a first TCI state in the first subset of the TCI states and a second TCI state in the second subset of the TCI states. The UE determines at least one first quasi co-located (QCL) assumption according to the first TCI state and at least one second QCL assumption according to the second TCI state. The UE receives a downlink transmission based on the at least one first QCL assumption and the at least one second QCL assumption.

15 Claims, 12 Drawing Sheets

(51) Int. Cl.
*H04W 72/04* (2009.01)
*H04L 5/00* (2006.01)
*H04L 25/02* (2006.01)
*H04W 76/27* (2018.01)
*H04B 7/0408* (2017.01)
*H04B 7/06* (2006.01)
*H04L 12/24* (2006.01)
*H04W 72/12* (2009.01)

(52) U.S. Cl.
CPC .......... *H04L 5/0048* (2013.01); *H04L 5/0051* (2013.01); *H04L 41/0806* (2013.01); *H04W 72/042* (2013.01); *H04W 72/1289* (2013.01); *H04W 76/27* (2018.02)

(58) Field of Classification Search
USPC .................................................. 370/392, 357
See application file for complete search history.

(56) References Cited

U.S. PATENT DOCUMENTS

| | | | |
|---|---|---|---|
| 2014/0351812 A1* | 11/2014 | Imai | .................... H04L 12/4633 718/1 |
| 2017/0238334 A1* | 8/2017 | Yang | ................. H04W 74/0808 370/336 |
| 2018/0206132 A1 | 7/2018 | Guo et al. | |
| 2018/0234959 A1 | 8/2018 | Ahn et al. | |
| 2019/0199496 A1 | 6/2019 | Qin et al. | |
| 2019/0254117 A1* | 8/2019 | Chen | ...................... H04L 5/0098 |
| 2019/0297603 A1* | 9/2019 | Guo | ....................... H04L 5/0051 |
| 2020/0100154 A1* | 3/2020 | Cirik | ..................... H04W 36/06 |
| 2020/0100193 A1* | 3/2020 | Cheng | ............... H04W 72/1268 |
| 2020/0100232 A1* | 3/2020 | Onggosanusi | ...... H04W 72/042 |

FOREIGN PATENT DOCUMENTS

| | | |
|---|---|---|
| WO | WO 2018/128365 A1 | 7/2018 |
| WO | WO 2018/128376 A1 | 7/2018 |
| WO | WO 2018/156696 A1 | 8/2018 |

OTHER PUBLICATIONS

Qualcomm Summary of Beam Mgmt. open issues, 3GPP TSG RAN WG1 meeting #91, R1-1721396, Dec. 1, 2017, pp. 1-5, 13.
International Search Report and Written Opinion dated Dec. 31, 2019, in PCT/CN2019/108371, 8 pages.
Qualcomm Incorporated. Maintenance for Non-Codebook Based UL Transmission. 3GPP TSG RAN WGl Meeting #93, RI-1807338, May 25, 2018, parts 1-4.
Combined Taiwanese Office Action and Search Report dated Nov. 18, 2020 in Taiwanese Patent Application No. 108134790 (with English translation of Category of Cited Documents), 9 pages.
"UL MIMO procedures for codebook based transmission", Ericsson, 3GPP TSG-RAN WG1 #89ah-NR, R1-1711008, Jun. 27-30, 2017, pp. 1-8.

* cited by examiner

| Codepoint of TCI field | 1st TCI state ID |
|---|---|
| 0 | #4 |
| 1 | #8 |
| 2 | #15 |
| 3 | ... |
| 7 | n/a |

500

| Codepoint of TCI field | 2nd TCI state ID |
|---|---|
| 0 | n/a |
| 1 | #27 |
| 2 | #63 |
| 3 | n/a |
| 7 | n/a |

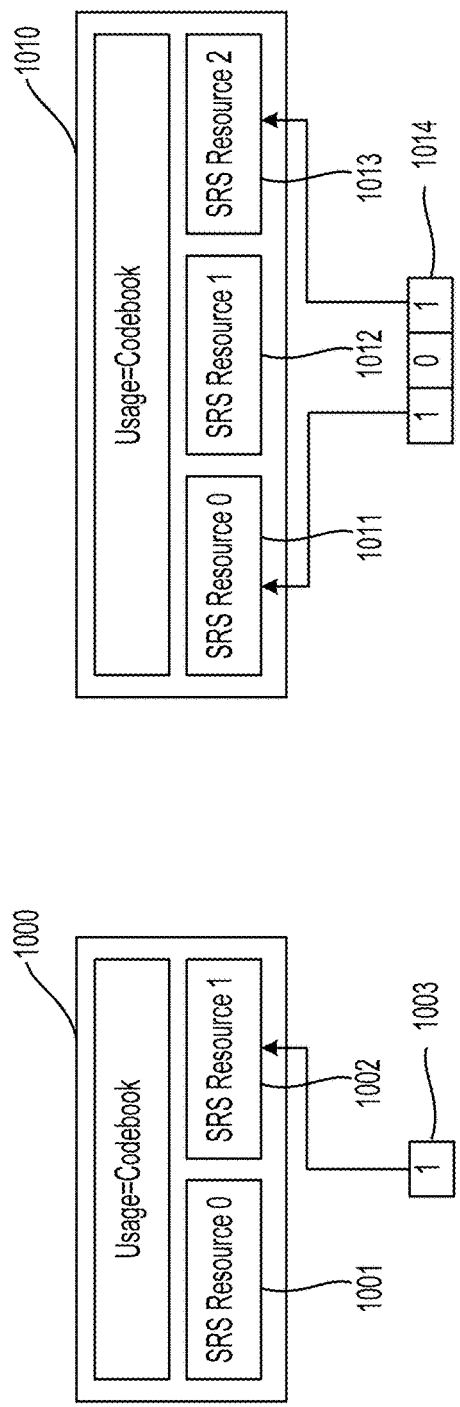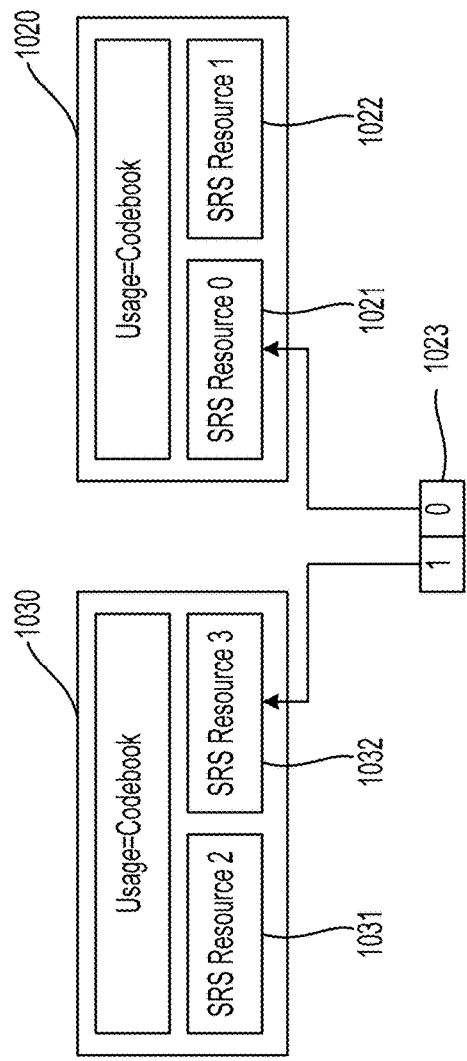

ENHANCEMENTS ON QCL FRAMEWORKS FOR MULTIPLE TRP OPERATION

INCORPORATION BY REFERENCE

This present disclosure claims the benefit of U.S. Provisional Application No. 62/737,247, "Enhancements on QCL Frameworks for Multiple TRP Operation" filed on Sep. 27, 2018, which is incorporated herein by reference in its entirety.

TECHNICAL FIELD

The present disclosure relates to wireless communications, and specifically relates to uplink channel transmission in a wireless communication system that is configured with multiple transmission reception points (TRPs) and multiple panels.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

5G New Radio (NR) radio-access technology supports multiple TRPs transmission and reception to extend coverage at higher-frequency bands. Multiple communication links can be formed between a base station (e.g., gNB) with multiple TRPs and a mobile device with multiple panels to increase throughput and/or to provide additional diversity gains. The base station may signal an indication to the mobile device to assist selection of a subset of the multiple communication links for downlink data or control transmission.

SUMMARY

Aspects of the disclosure provide a method for configuring user equipment (UE). Under the method, configuration information of multiple transmission configuration indication (TCI) states is transmitted from a base station to the UE in a wireless communications network. One or more activation commands are received to associate a first subset of the configured TCI states with one or more codepoints of a TCI field and a second subset of the configured TCI states with the one or more codepoints of the TCI field. A codepoint of the TCI field is received and the codepoint is associated with a first TCI state in the first subset of the configured TCI states and a second TCI state in the second subset of the configured TCI states. Then at least one first quasi co-located (QCL) assumption according to the first TCI state and at least one second QCL assumption according to the second TCI state can be determined. Finally, a downlink transmission is received based on the at least one first QCL assumption and the at least one second QCL assumption.

In an embodiment, the downlink transmission is a physical downlink shared channel (PDSCH) transmission, and the TCI field is carried in a downlink control information (DCI) that schedules the PDSCH.

In an embodiment, the downlink transmission is received by applying the at least one first QCL assumption to a first demodulation reference signal (DMRS) port group of the downlink transmission and the at least one second QCL assumption to a second DMRS port group of the downlink transmission.

In an embodiment, each of the configured TCI states is configured with at least one QCL information, and each of the at least one QCL information indicates a respective reference signal and at least one associated QCL type.

In an embodiment, one activation command associates the first subset of the configured TCI states to the one or more codepoints of the TCI field in DCI and the second subset of the configured TCI states to the one or more codepoints.

In an embodiment, the activation command includes a selection status field for the one or more codepoints of the TCI field and maps the first and second subsets of the configured TCI states to the one or more codepoints according to the selection status field.

In an embodiment, a first activation commands associates the first subset of the configured TCI states to the one or more codepoints of the TCI field and a second activation command associates the second subset of the configured TCI states to the one or more codepoints of the TCI field.

In an embodiment, the first activation command and the second activation command have different logical channel identifications (LCIDs).

In an embodiment, the second activation command includes a selection status field for the one or more codepoints of the TCI field and maps the second subset of the configured TCI states to the one or more codepoints according to the selection status field.

In an embodiment, a third activation command is received. The third command has the same LCD with the second activation command and associates a third subset of the configured TCI states to the one or more codepoints of the TCI field.

In an embodiment, the codepoint that indicates at least one TCI state in the first subset, the second subset, and the third subset of the configured TCI states is received. The at least one QCL assumption for the first DMRS port group, the second DMRS port group, and a third DMRS port group can be determined according to the at least one TCI state associated to the codepoint.

In an embodiment, the second and third activation commands include a field indicating a DMRS port group.

Aspects of the disclosure further provide user equipment (UE) that can include circuitry configured to receive configuration information of multiple transmission configuration indication (TCI) states transmitted from a base station in a wireless communications network. The circuitry receives one or more activation commands that associate a first subset of the configured TCI states with one or more codepoints of a TCI field and a second subset of the configured TCI states with the one or more codepoints of the TCI field. The circuitry receives a codepoint of the TCI field that is associated with a first TCI state in the first subset of the configured TCI states and a second TCI state in the second subset of the configured TCI states. The circuitry determines at least one first quasi co-located (QCL) assumption according to the first TCI state and at least one second QCL assumption according to the second TCI state. The circuitry receives a downlink transmission based on the at least one first QCL assumption and the at least one second QCL assumption.

Aspects of the disclosure further provide a non-transitory computer-readable medium storing instructions implementing any one of a combination method for configuring UE.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows an exemplary codepoint of a TCI field with one or two associations of TCI states according to embodiments of the disclosure;

FIGS. 10A-10C show various exemplary sounding reference signal (SRS) resource set configurations according to embodiments of the disclosure;

DETAILED DESCRIPTION OF EMBODIMENTS

Figure 1:
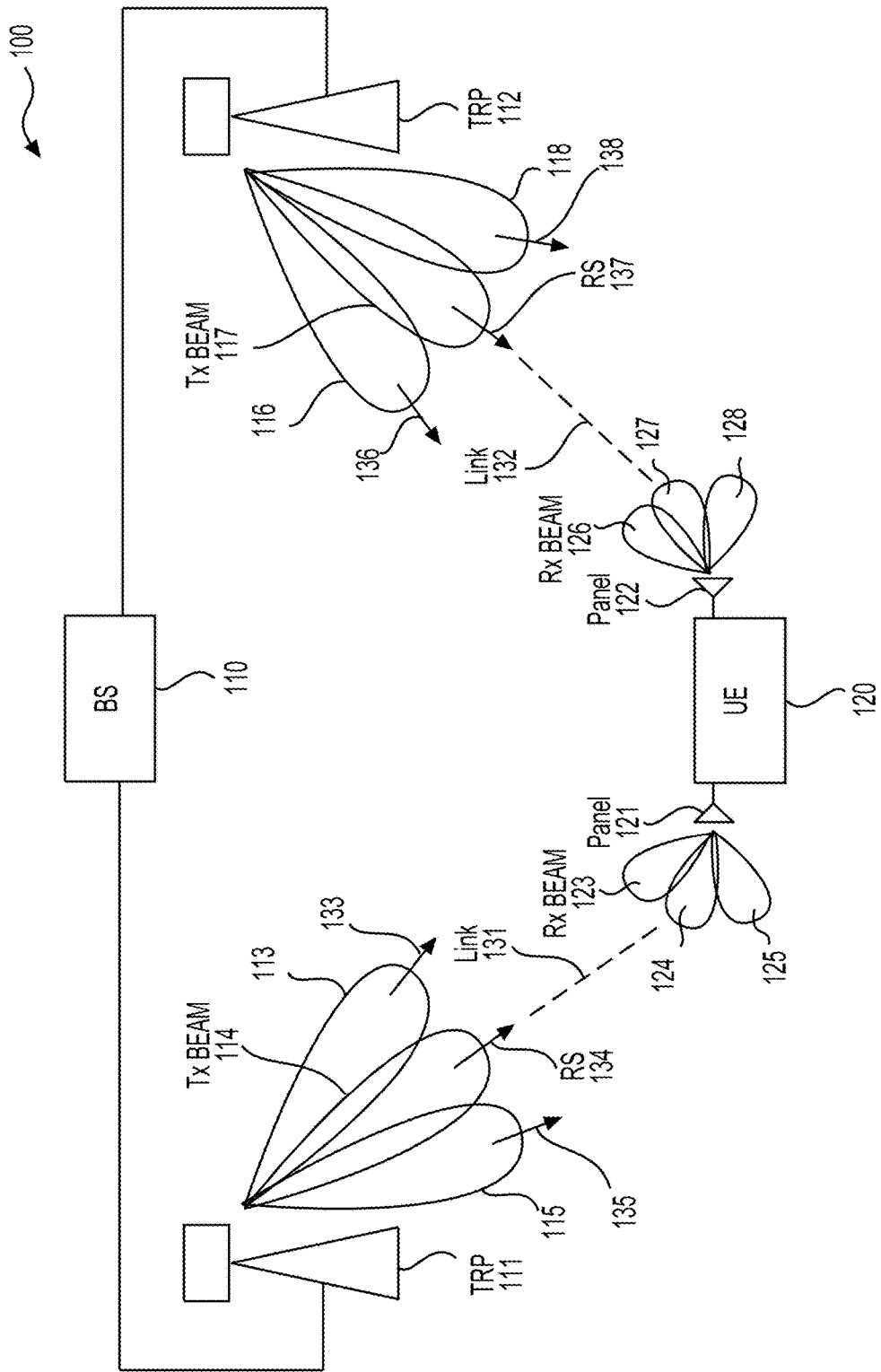
FIG. 1 shows an exemplary beam-based wireless communication system according to embodiments of the disclosure.

FIG. 1 shows an exemplary beam-based wireless communication system 100 according to embodiments of the disclosure. The system 100 includes a base station (BS) 110 configured with two transmission reception points (TRPs) 111 and 112. Further, the system 100 includes user equipment (UE) 120 configured with two antenna panels 121 and 122.

According to aspects of the disclosure, the system 100 can employ the 5th generation (5G) technologies developed by the 3rd Generation Partnership Project (3GPP). For example, orthogonal frequency-division multiplexing (OFDM) scheme is employed for downlink and uplink transmission. In addition, millimeter Wave (mm-Wave) frequency bands and beamforming technologies can be employed in the system 100. Accordingly, the BS 110 and the UE 120 can perform beamformed transmission or reception. In the beamformed transmission, wireless signal energy can be focused in a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

In an embodiment, the BS 110 implements a gNB node as specified in 5G New Radio (NR) air interface standards developed by 3GPP. The BS 110 can be configured to control one or more TRPs, such as the TRPs 111 and 112, that are distributed at different locations to cover different serving areas. Each TRP can include a set of antenna arrays. Under the control of the BS 110, directional Tx or Rx beams can be formed from the set of antenna arrays for transmitting or receiving wireless signals. In the FIG. 1 example, the TRPs 111 and 112 can form a set of Tx beams 113-115 and 116-118, respectively. In an example, the maximum number of Tx beams generated from a TRP can be 64. In an embodiment, multiple Tx beams towards different directions are generated simultaneously. In an embodiment, only one Tx beam is generated at a given time. Over each Tx beam, downlink L1/L2 control channel or data channel, such as a physical downlink control channel (PDCCH) or a physical downlink shared channel (PDSCH), can be transmitted.

The UE 120 can be configured to control one or more antenna panels, such as the panels 121 and 122, that are distributed at different locations. Each antenna panel can include a set of antenna array. Under the control of UE 120, directional Tx or Rx beams can be formed from the set of antenna arrays for transmitting or receiving wireless signals. In the FIG. 1 example, the antenna panels 121 and 122 can form a set of Rx beams 123-125 and 126-128, respectively. In an embodiment, the UE 120 is capable of forming multiple Rx beams towards different directions at a same time. In various embodiments, the UE 120 can be a mobile phone, a laptop computer, a vehicle carried mobile communication device, a utility meter, and the like.

According to aspects of the disclosure, multiple communication links (e.g., downlinks or uplinks) can be established between the multi-TRPs of the BS 100 and the multi-panels of the UE 120. In the FIG. 1 example, two communication links 131 and 132 are established between the BS 110 and the UE 120. The communication link 131 is established between the TRP 111 and the antenna panel 121. The communication link 132 is established between the TRP 112 and the antenna panel 122. The multiple communication links can be used to increase the throughput and/or to provide additional diversity gains. To improve the throughput, in an embodiment, different data streams can be transmitted on different links, such that a total number of layers scheduled for the UE 120 is increased. To achieve the diversity gains, in an embodiment, the same data stream can be transmitted on different links, such that the UE 120 has multiple received signals that can be used to improve reliability of the data stream.

In an embodiment, the UE 120 determines an Rx beam (or an Rx spatial filter) among multiple Rx beams for receiving signals from a TRP according to a measurement of a reference signal (RS). For example, while the UE 120 is in connected mode, a beam quality monitoring process can be repeatedly carried out in an embodiment. During the quality monitoring process, based on a configuration received from the BS 110, the UE 120 may periodically measure signal qualities of a set of communication (or beam pair) links formed between a set of Tx beams of the BS 110 and a set of Rx beams of the UE 120. For example, a set of RSs 133-138 are transmitted from over the set of Tx beams 113-118 (e.g., with a set of Tx spatial filters) of the TRPs 111 and 112 of the BS 110. Reference signal receive powers (RSRPs), for example, can be measured based on the set of RSs 133-138 received by the set of Rx beams 123-128 (e.g., with a set of Rx spatial filters) of the antenna panels 121 and 122 of the UE 120. Base on the measurement results, the UE 120 can determine a subset of the RSs 133-138 with good qualities (e.g., above a threshold) and report them to the BS 110. At the network side, the BS 110 can determine, for example, a first RS 134 of the TRP 111 for transmitting signals to the UE 120 based the reported RSs from the UE 120, where the first RS 134 is transmitted over the Tx beam 114 of the TRP 111 and received by the Rx beam 124 of the panel 121 of the UE 120. The Rx beam 124 and the Tx beam 114 are thus associated with the first RS 134 and the communication (or beam pair) link 131 is established between the TRP 111 and the panel 121.

In a similar way, a second RS 137 transmitted by the Tx beam 117 of the TRP 112 of the BS 110 and received by the Rx beam 127 of the panel 122 of the UE 120 can be determined based on the reported RSs from the UE 120. As a result, the Rx beam 127 and the Tx beam 117 are associated with second RS 137 and the communication link 132 is established between the TRP 112 and the panel 122.

As described above, the BS 110 can have multiple options of selecting a Tx beam for a transmission to the UE 110. For example, the BS 110 can transmit an L1/L2 data channel or control channel over either of the Tx beams 114 or 117. Accordingly, the BS 110 can signaling a Rx configuration to the UE 120 to indicate a Rx beam for reception of a to-be-conducted transmission from the BS 110 to the UE 120 in an embodiment. The indicated Rx beam corresponds to the Tx beam selected among the Tx beams 114 and 117. The signaling can be performed via one of multiple ways, such as a radio resource control (RRC) message, a medium access control layer control element (MAC-CE), a field of a downlink control information (DCI) carried in a PDCCH, and the like.

According to aspects of the disclosure, a quasi-co-location (QCL) indication (or QCL assumption) can be provided for a downlink transmission from the BS 110 to the UE 120. The QCL indication includes an RS and a QCL type. The RS can be, for example, a channel station information reference signal (CSI-RS) or a synchronization signal block (SSB). According to 3GPP, four QCL types are defined as listed below.

QCL-TypeA: {Doppler shift, Doppler spread, average delay, delay spread},
QCL-TypeB: {Doppler shift, Doppler spread},
QCL-TypeC: {Doppler shift, average delay},
QCL-TypeD: {Spatial Rx parameter}.

In an embodiment, based on the RS indicated by the QCL indication (or QCL assumption), the UE 120 can assume that one or more antenna ports for the downlink transmission is QCLed with transmission of the indicated RS with respect to the QCL type indicated by the QCL indication. According to 3GPP, the one or more antenna ports and the indicated RS are said to be QCLed if properties of the channel over which a symbol on the one or more antenna ports is conveyed can be inferred from the channel over which a symbol on the indicated RS is conveyed. In other words, the QCL indication indicates that the UE 120 can use the same channel parameter(s) (e.g., Doppler shift, average delay, or Rx spatial filter, etc.) for reception of the indicated RS to receive the downlink transmission. For example, if the indicated RS is CSI-RS and the indicated QCL type is QCL-TypeD, the UE 120 can determine to use the same spatial Rx parameters (e.g., same Rx beam or spatial Rx filter) for reception of the CSI-RS to perform the reception of the downlink transmission. The QCL relationship in terms of spatial Rx parameter (e.g., QCL-TypeD) is referred to as a spatial QCL (sQCL). The corresponding QCL indication indicating such a sQCL is referred to as a sQCL indication. According to a sQCL indication, the UE 120 can obtain a sQCL assumption to determine an Rx beam for reception of a downlink transmission.

According to aspects of the disclosure, the QCL indication (or QCL assumption) can be provided by a transmission configuration indication (TCI) state configuration.

Figure 2:
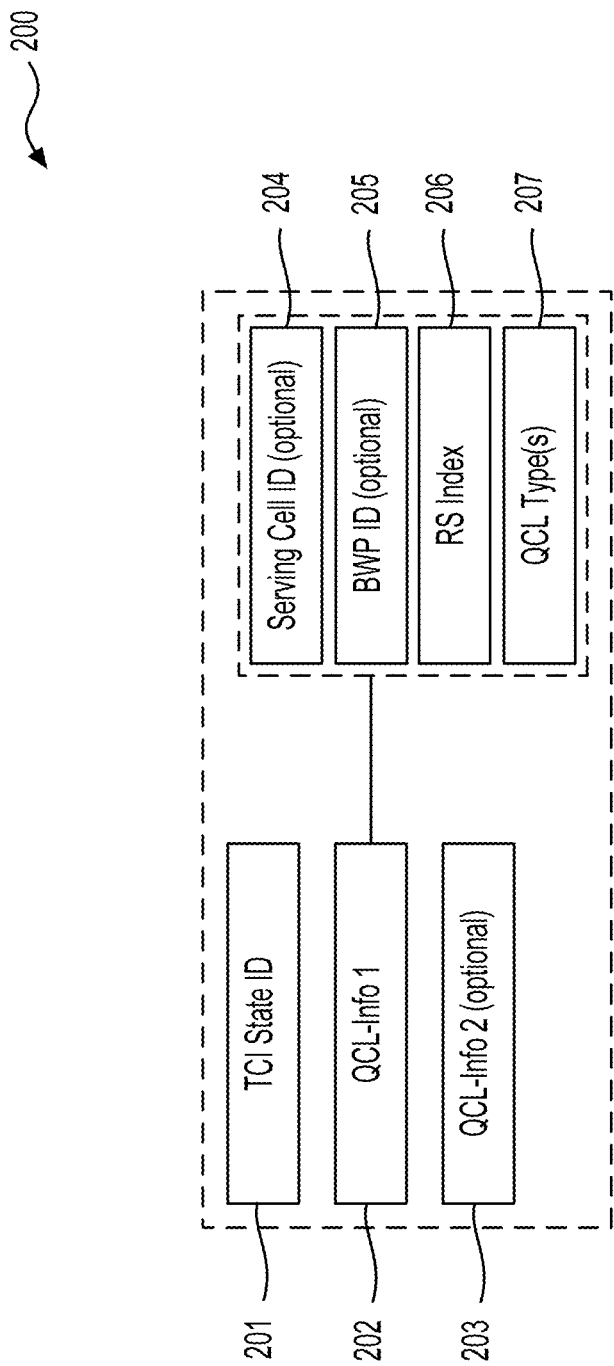
FIG. 2 shows an exemplary TCI state configuration according to embodiments of the disclosure.

FIG. 2 shows an exemplary TCI state configuration 200 according to embodiments of the disclosure. The TCI state configuration 200 includes a TCI state ID 201 that identifies a TCI state and one or two QCL information (QCL-info) 202 and 203. It is noted that the second QCL-info 203 is optional and may not be included in some embodiments. However, for the case of two QCL information, the QLC types can be different, regardless of whether the two RSs are different or not. Each QCL-info includes an RS index 206 and one or more QCL types 207 (e.g., one or multiple of QCL-TypeA-QCL-TypeD).

In an embodiment, based on the RS index 206, the UE 120 can determine a corresponding SSB or CSI-RS. Accordingly, the UE 120 can determine a QCL assumption that indicates one or more antenna ports of the UE 120 for the downlink transmission are QCLed with the RS with respect to the QCL type 207. For example, both the one or more antenna ports and the RS can have the same spatial Rx parameters if the QCL type 207 is QCL-TypeD, or can have the same Doppler shift and average delay if the QCL type 207 is QCL-TypeC. In addition, each QCL-info includes a serving cell ID 204 that indicates an identification of the serving cell for which the RS applies and a bandwidth part (BWP) ID 205 that indicates an identification of the bandwidth part for which the RS applies. It is noted the serving cell ID 204 and the BWP ID 205 are optional in the TCI state configuration 200 in some embodiments.

According to aspects of the disclosure, a TCI state indicates a QCL assumption between one or two RSs and one or more demodulation reference signal (DMRS) ports of a to-be-transmitted channel to which the TCI state is configured. Thus, when a TCI state is configured or indicated to the UE 120 for reception of a PDCCH or a PDSCH, at least one QCL type of the one or more DMRS ports of the PDCCH or PDSCH can be conveyed to the UE 120. The UE 120 can accordingly receive the PDCCH or PDSCH via the one or more DMRS ports based on the conveyed at least one QCL type. In some examples, each TCI state contains parameters for configuring QCL relationship between the one or two RSs and the respective one or more DMRS ports. For the case of two RSs, the QCL types corresponding to the two RSs can be different regardless of whether the references are the same RS or different RSs.

Among the above four QCL types, the QCL-typeD represents a spatial QCL (sQCL) relationship, and thus can be used to determine an Rx beam (or an Rx spatial filter) at the UE 120. A TCI state indicating a QCL-typeD can be referred to as a spatial TCI state. For example, at the BS 110 side, in order to signal a sQCL indication, the BS 110 can signal a spatial TCI state among the list of TCI state configurations to the UE 120 via an RRC message, a MAC-CE, or a TCI field of a DCI carried in a PDCCH. Based on an RS indicated by the spatial TCI state, the UE 120 can determine an Rx beam (or Rx spatial filter).

According to aspects of the disclosure, the UE 120 can be configured with a list of up to M TCI state configurations, where M depends on the UE capability, and a TCI state configuration in the list can be trigged for reception of a to-be-transmitted downlink data channel, downlink control channel, or downlink RS.

In some embodiments, a TCI state configuration triggering process can include a few steps as follows. First, M TCI state configurations can be configured with higher layer parameters of the BS 110, such as PDSCH-Config. For example, a TCI state table managed by 'tci-StatesToAddModList' and 'tci-StatesToReleaseList' is defined in PDSCH-Config. The table includes the M TCI state configurations and a maximum size of the table is 128 in an embodiment. The table can be transmitted from the BS 110 to the UE 120 through RRC signaling such that the UE 120 is configured with the M TCI state configurations. Second, if M is larger than one, the UE 120 can receive from the BS 110 an activation command to activate a subset of the M TCI state configurations from the TCI state table 'tci-StatesToAddModList' and map them into one or more codepoints of a TCI field. The activation command can be a MAC-CE and a maximum size of the codepoints is 8 in an embodiment. Finally, for a PDSCH reception, the UE 120 can receive a certain codepoint of a TCI field in a DCI scheduling the PDSCH to trigger a corresponding TCI state configuration and obtain a QCL assumption indicated in the TCI state configuration.

Figure 3:
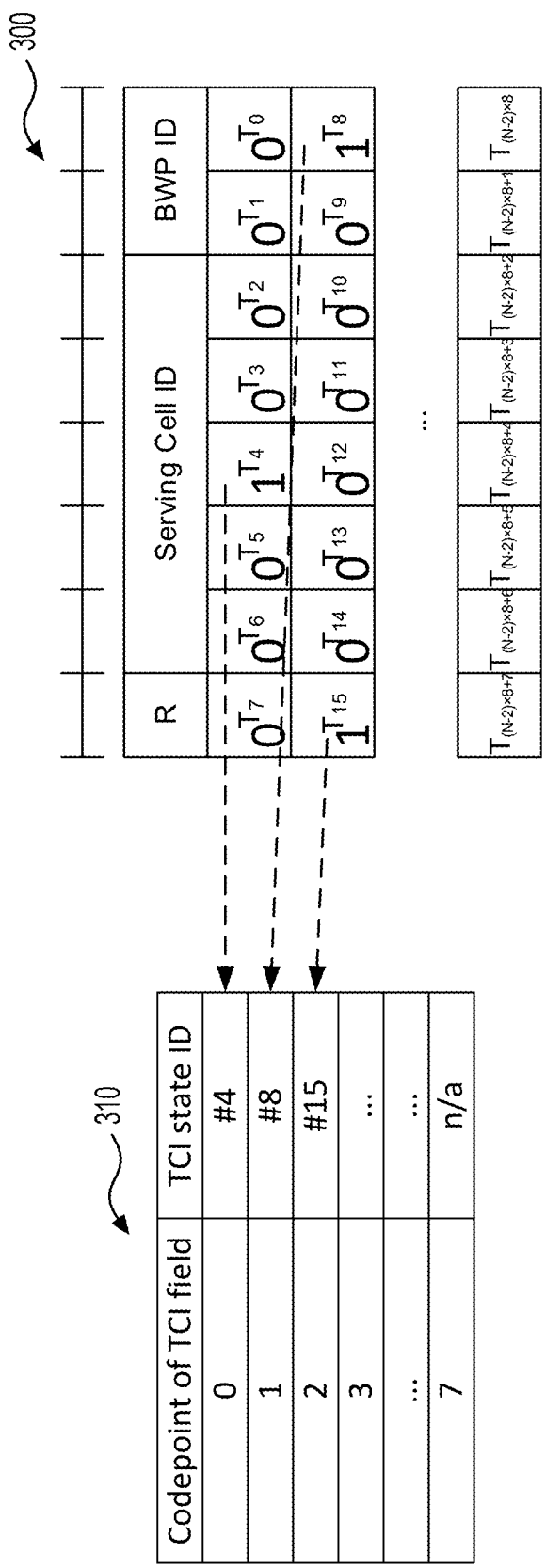
FIG. 3 shows an exemplary mapping process of activating TCI states according to embodiments of the disclosure.

FIG. 3 shows an exemplary association process of activating TCI states according to embodiments of the disclosure. In the association (or activating) process, an activation command 300 is used to associate a subset of configured TCI states with one or more codepoints of a TCI field, and the association can be represented as an association table 310. In the FIG. 3 example, a number of the codepoints of a TCI field is 8. It means that up to 8 configured TCI states can be associated with the codepoints. In an embodiment, the activation command 300 can be a MAC-CE that is carried in a PDSCH. In the activation command 300, if a bit in a specific location is set to be '1', it means that it activate the TCI state corresponding to the position of the bit. Otherwise, if the bit is set to be '0', it means that it deactivates the TCI state corresponding to the position of the bit. For example, if T4=1, it activate the index 4 of the M TCI states configured in PDSCH-Config. The list of bit positions that are set to be '1' is assigned to the 8 codepoints and only up to 8 bit fields in this MAC-CE can be set to be '1'. The positions of '1' bits are assigned to the codepoints in an increasing order. For example, T4 is assigned to codepoint 0, T8 is assigned to codepoint 1, and T15 is assigned to codepoint 3 of the codepoints. In addition, the activation command 300 includes a serving cell ID that indicates an identification of the serving cell for which the TCI states apply and a BWP ID that indicates an identification of the bandwidth part for which the TCI states apply. It is noted that the serving cell ID and the BWP ID are optional in the activation command 300 in some embodiments.

For a PDSCH reception, the UE 120 can receive one of the codepoints of a TCI field in a DCI scheduling the PDSCH to trigger a corresponding TCI state configuration and obtain a QCL assumption indicated in the TCI state configuration. For example, in a TCI field in a DCI scheduling a PDSCH, codepoint 1 is received. According to the association table 310, codepoint 1 indicates TCI state #8 configured with one or two QCL information (QCL-info). Accordingly, the UE 120 can determine that one or more DMRS ports of the UE 120 for the scheduled PDSCH transmission are QCLed with the RS with respect to one or more corresponding QCL types according to the one or two QCL-info.

According to aspects of the disclosure, a TCI state activation/deactivation command can be identified by a logical control identification (LCID) included in a subheader of a MAC-CE.

Figure 4:
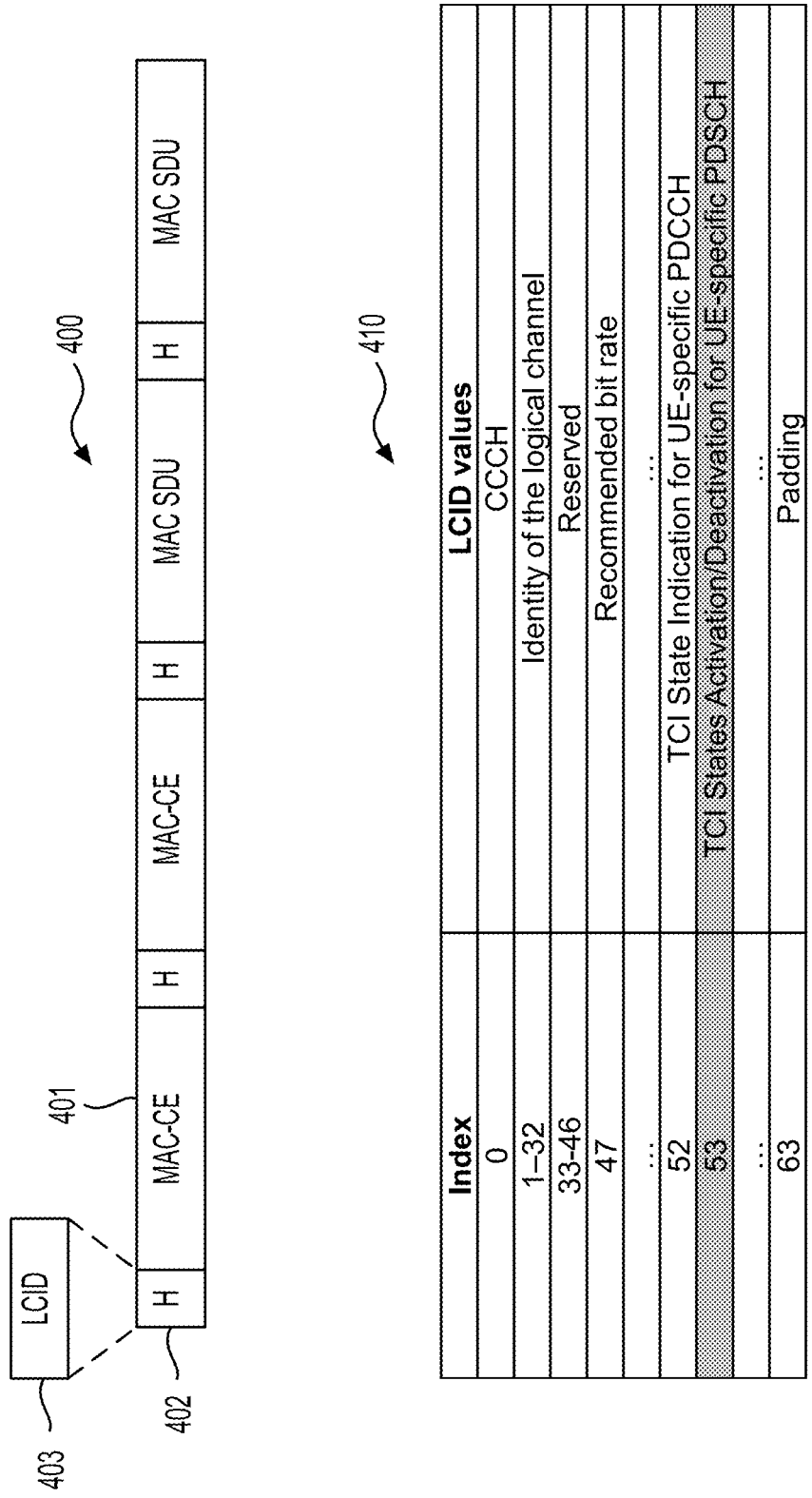
FIG. 4 shows an exemplary medium access control layer control element (MAC-CE) including a logical control identification (LCID) and a table of LCID values according to embodiments of the disclosure.

FIG. 4 shows an exemplary MAC-CE including a logical control identification (LCD) and a table of LCID values according to embodiments of the disclosure. A MAC protocol data unit (PDU) 400 can include multiple MAC-CEs and MAC service data units (SDUs). Each of the MAC-CEs and MAC SDUs has a respective subheader including a LCID field. The LCID field identifies a logical channel instance of the corresponding MAC SDU or a type of the corresponding MAC-CE or padding as described in a table 410 of LCID values. For example, a MAC-CE 401 included in the MAC PDU 400 has a subheader 402 that includes a LCID 403. Based on the table 410, if a value of the LCID 403 is 53, it means the MAC-CE 401 is a TCI state activation/deactivation command for UE-specific PDSCH.

In one example, TCI state signaling for a PDCCH reception can be performed in the following way. A TCI state list for the PDCCH reception can be signaled to the UE 120 via RRC signaling. In a first scenario, the TCI state list for the PDCCH reception includes only one TCI state. Accordingly, the TCI state can be directly applied to the PDCCH reception without an additional MAC-CE signaling. In a second scenario, the TCI state list for the PDCCH reception includes more than one TCI state, thus an additional MAC-CE signaling is performed to activate one of the TCI states for the PDCCH reception. In one example, TCI signaling for a PDSCH reception can be performed in the following way. A TCI state list for the PDSCH reception including one or more TCI states can be configured to the UE 120 via RRC signaling. In a first scenario, a MAC-CE activates only one TCI state in the configured TCI state list. Accordingly, the activated TCI state is directly applied for the PDSCH reception without an additional DCI signaling in a PDCCH scheduling the PDSCH. In a second scenario, the MAC-CE activates more than one TCI state in the configured TCI state list. Accordingly, an additional DCI signaling in the PDCCH scheduling the PDSCH is used.

The QCL framework for multiple TRPs or panels operation can be improved. According to aspects of the disclosure, for the multi-TRP or multi-panel operation, the UE 120 can be configured with more than one DMRS port groups for a same PDSCH reception at a same time for increasing the throughput. Since only one DMRS port group can be associated with a codepoint of a TCI field, to configure more than one DMRS port groups, the UE 120 may obtain multiple associations for the codepoint of the TCI field with each association corresponding to a certain DMRS port group. To obtain the multiple associations, the UE 120 may receive one or more activation commands.

FIG. 5 shows an exemplary codepoint of a TCI field with one or two associations of TCI states according to embodiments of the disclosure. In FIG. 5, the UE 120 can be configured with two DMRS port groups for a PDSCH and M TCI states. In a first association 500, a first subset of the M configured TCI states are associated with one or more codepoints of the TCI field. In a second association 501, a second subset of the M configured TCI states are associated with one or more codepoints of the TCI field. In an embodiment, if a codepoint of a TCI field is associated with two TCI states according to the associations 500 and 501, a first TCI state of the associated TCI states can be applied to a first DMRS port group of the DMRS port groups, and a second TCI state of the associated TCI states can be applied to a second DMRS port group of the DMRS port groups. For example, codepoint 1 is associated with TCI state #8 by the first association 500 and TCI state #27 by the second association 501. If the UE 120 receives codepoint 1 of a TCI field in a DCI scheduling a PDSCH, TCI state #8 indicated by codepoint 1 can be applied to a first DMRS port group for the PDSCH reception and TCI state #27 indicated by codepoint 1 can be applied to a second DMRS port group for the PDSCH reception.

Figure 6:
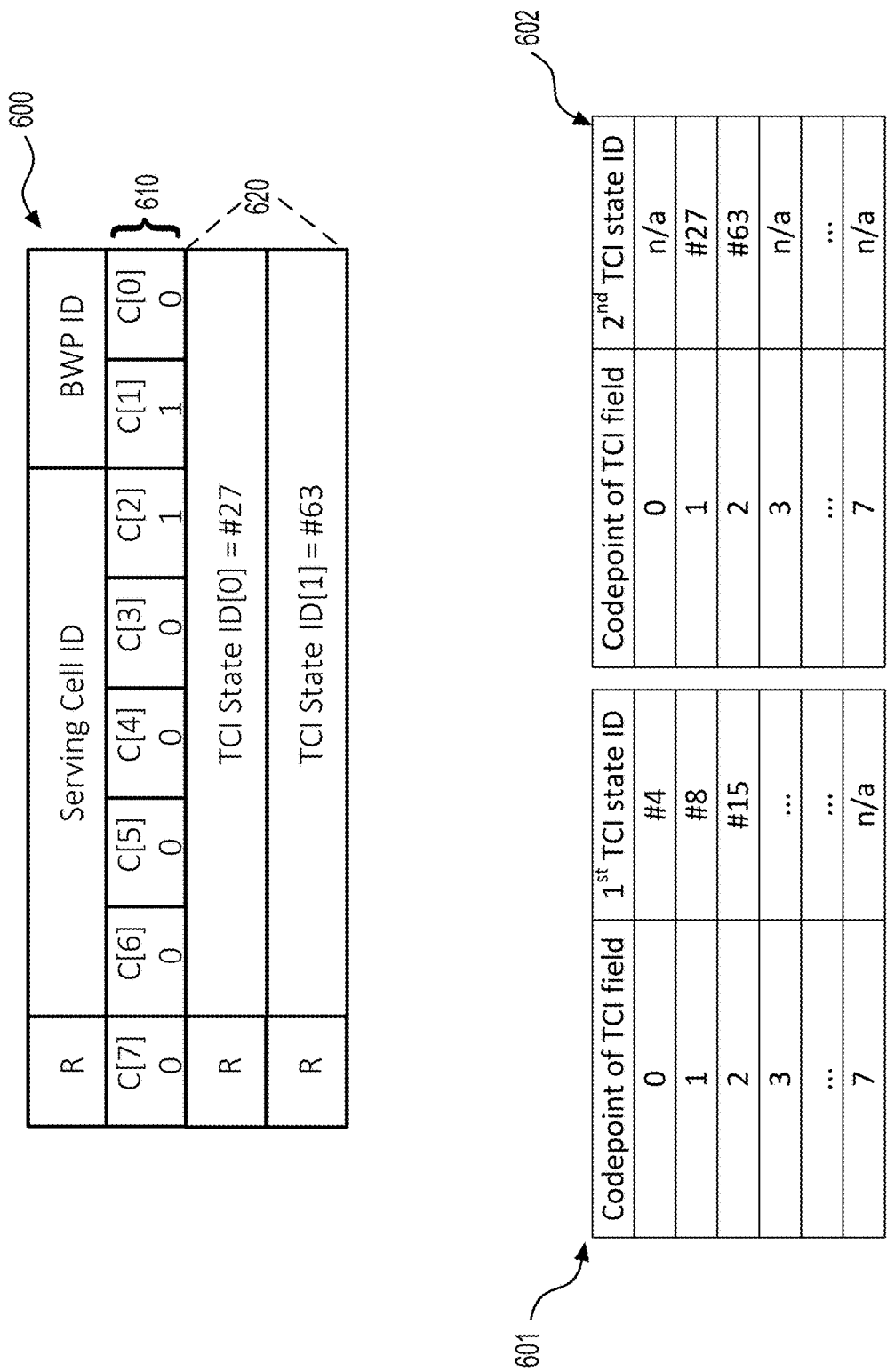
FIG. 6 shows an exemplary activation command for associating TCI states according to embodiments of the disclosure.

FIG. 6 shows an exemplary activation command 600 for associating TCI states according to embodiments of the disclosure. In FIG. 6, the UE 120 can be configured with two DMRS port groups for a PDSCH and M TCI states. To activate the two DMRS port groups at a same time, two sets of TCI states are mapped into codepoints of a TCI field according to the associations 601 and 602, respectively. To differentiate the two associations, different activation commands can be employed. For example, a first activation command maps a first subset (e.g., N) of the M TCI states for the first association 601, and a second activation command maps a second subset (e.g., K) of the M TCI states for the association 602. Therefore, when the UE 120 receives a codepoint that maps a first TCI state in the association 601 and a second TCI state in the association 602, the first TCI state and the second TCI state can be applied to two different DMRS port groups. For example, if codepoint 1 is received, the first TCI state applied to the first DMRS port group is #8 and the second TCI state applied to the second DMRS port group is #27. It is noted that N/A means no TCI state is associated with the codepoint. For example, if codepoint 0 is received, only the first DMRS port group is enabled, and the indicated TCI state #4 is applied to the first DMRS port group. The second DMRS port group is disabled.

According to aspects of the disclosure, when the UE 120 is configured with two DMRS port groups, two activation commands can be used to activate the two DMRS port groups and can have different formats or types. In an embodiment, if both activation commands are MAC-CEs, the two activation commands can have different LCIDs. For example, the first MAC-CE may use a same LCID (e.g., 53) defined in the table 410 while the second MAC-CE may use a different LCD.

In an embodiment, the first MAC-CE can have the same type as the activation command 300 and the second MAC-CE can have the same type as the activation command 600. The activation command 600 includes a selection status field 610 for the codepoints and a TCI state ID field 620. The selection status field 610 indicates whether a TCI state is associated with each codepoint by the activation command 600. For example, C[0] refers to the first codepoint (e.g., codepoint 0) in the codepoints of a TCI field, C[1] refers to the second codepoint (e.g., codepoint 1), and so on. If the C[i] is set to '1', it indicates that a TCI state would be mapped to the i-th codepoint by the activation command 600. If the C[i] is set to '0', it indicates that no TCI state would be mapped to the i-th codepoint by the activation command 600. For example, C[1]=1, indicating that a TCI state would be mapped to codepoint 1 by the activation command 600, and C[0]=0, indicating no TCI state would be mapped to codepoint 0 by the activation command 600. The TCI state ID field 620 contains TCI state IDs corresponding to the selected codepoints. For example, TCI state ID[0] indicates the first TCI state applied to the first selected codepoint with C[i] field set to '1', TCI state 1D[1] indicates the second TCI state applies to the second selected codepoint with C[i] field set to '1', and so on. In the example shown in FIG. 6, C[1] and C[2] are selected. Therefore, TCI state ID[0] corresponds to C[1], and TCI state ID[1] corresponds to C[2]. In the TCI state ID field 620, TCI state ID[0]=#27 and TCI state ID[1]=#63. Accordingly, in the second association 602, TCI states #27 and #63 are mapped to codepoints 1 and 2, respectively. Since a size of the activation command 600 depends on the selection status of codepoints, and thus is variable. In addition, the activation command 600 includes a serving cell ID that indicates an identification of the serving cell for which the activation command applies and a BWP ID that indicates an identification of the bandwidth part for which the activation command applies. It is noted that the serving cell ID and the BWP ID are optional in the activation command 600 in some embodiments.

Figure 7:
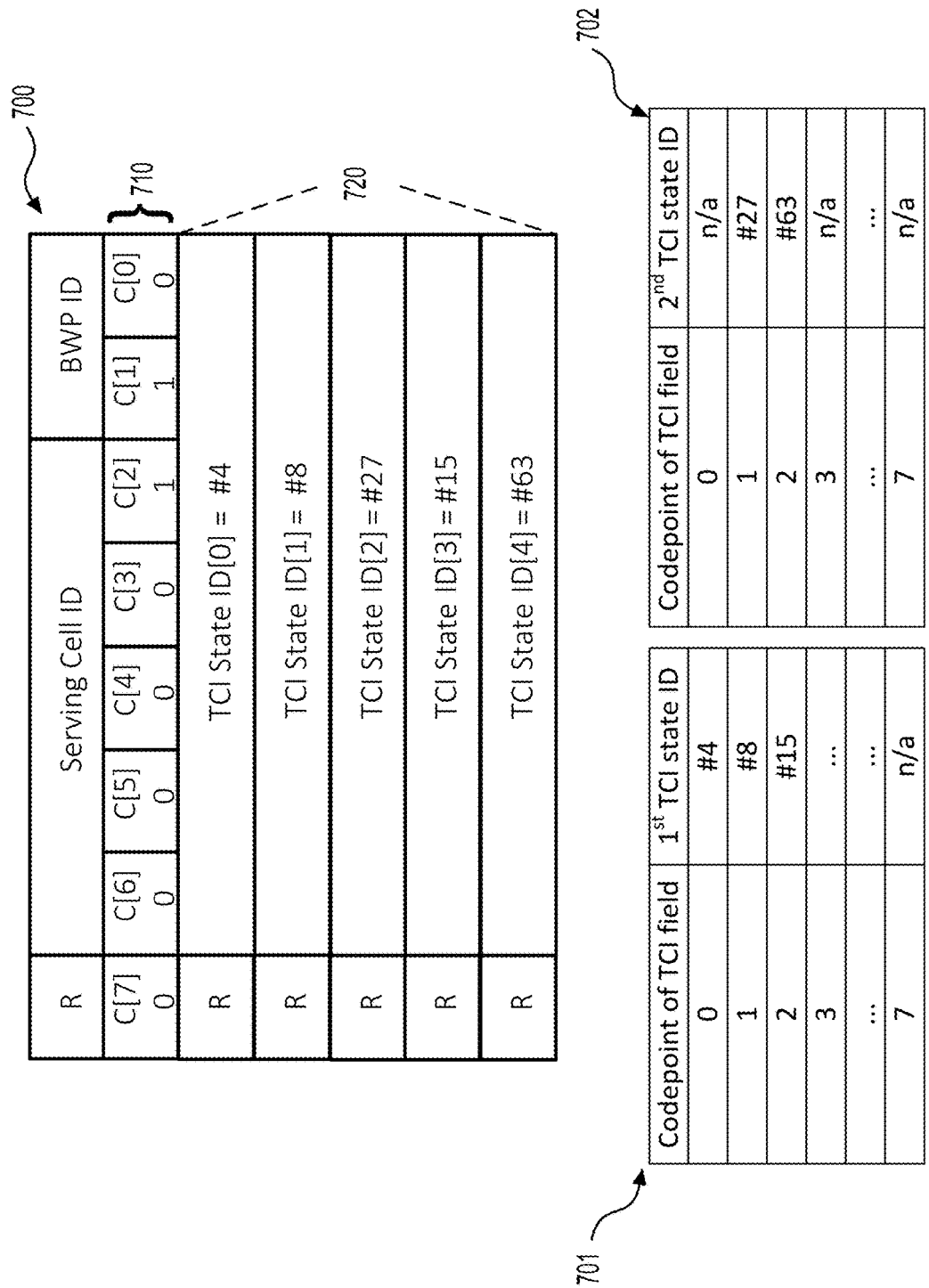
FIG. 7 shows another exemplary activation command for associating TCI states according to embodiments of the disclosure.

FIG. 7 shows another exemplary activation command 700 for associating TCI states according to embodiments of the disclosure. In FIG. 7, the UE 120 can be configured with two DMRS port groups for a PDSCH and M TCI states. To activate the two DMRS port groups at a same time, two sets of TCI states are mapped into the codepoints of a TCI field according to associations 701 and 702, respectively. Different from the example shown in FIG. 6, only one activation command 700 is employed for the associations 701 and 702. Similar to the activation command 600, the activation command 700 also includes a status selection field 710 for the codepoints and a TCI state ID field 720, and thus has a variable size. However, different from the status selection field 610, the selection status field 710 indicates that the number of associated TCI states for each codepoint by the activation command 700. For example, C[0] refers to the first codepoint (e.g., codepoint 0) in the codepoints of a TCI field, C[1] refers to the second codepoint (e.g., codepoint 1), and so on. If the C[i] is set to '0', it indicates that one TCI state would be mapped to the i-th codepoint by the activation command 700. If the C[i] is set to '1', it indicates that two TCI states would be mapped to the i-th codepoint by the activation command 700. For example, C[0]=0, indicating that only one TCI state would be mapped to codepoint 0 by the activation command 700, and C[1]=1, indicating two TCI states would be mapped to codepoint 1 by the activation command 700. The TCI state ID field 720 contains TCI state IDs corresponding to the codepoints. In the example shown in FIG. 7, C[0] is set to '0'. Therefore, TCI state ID[0] corresponds to C[1]. Since C[1] is set to '1', TCI state ID[1] and TCI state ID[2] corresponds to C[1]. In the TCI state ID field 720, TCI state ID[0]=#4. Accordingly, in the first association 701, TCI states #4 is mapped to codepoints 0. In the TCI state ID field 720, TCI state ID[1]=#8 and TCI state ID[2]=#27. Accordingly, in the first association 701 and the second association 702, TCI states #8 and TCI states #27 are mapped to codepoints 1. Since a size of the activation command 700 depends on the selection status of codepoints, and thus is variable. In addition, the activation command 700 includes a serving cell ID that indicates an identification of the serving cell for which the activation command applies and a BWP ID that indicates an identification of the bandwidth part for which the activation command applies. It is noted that the serving cell ID and the BWP ID are optional in the activation command 700 in some embodiments.

Figure 8:
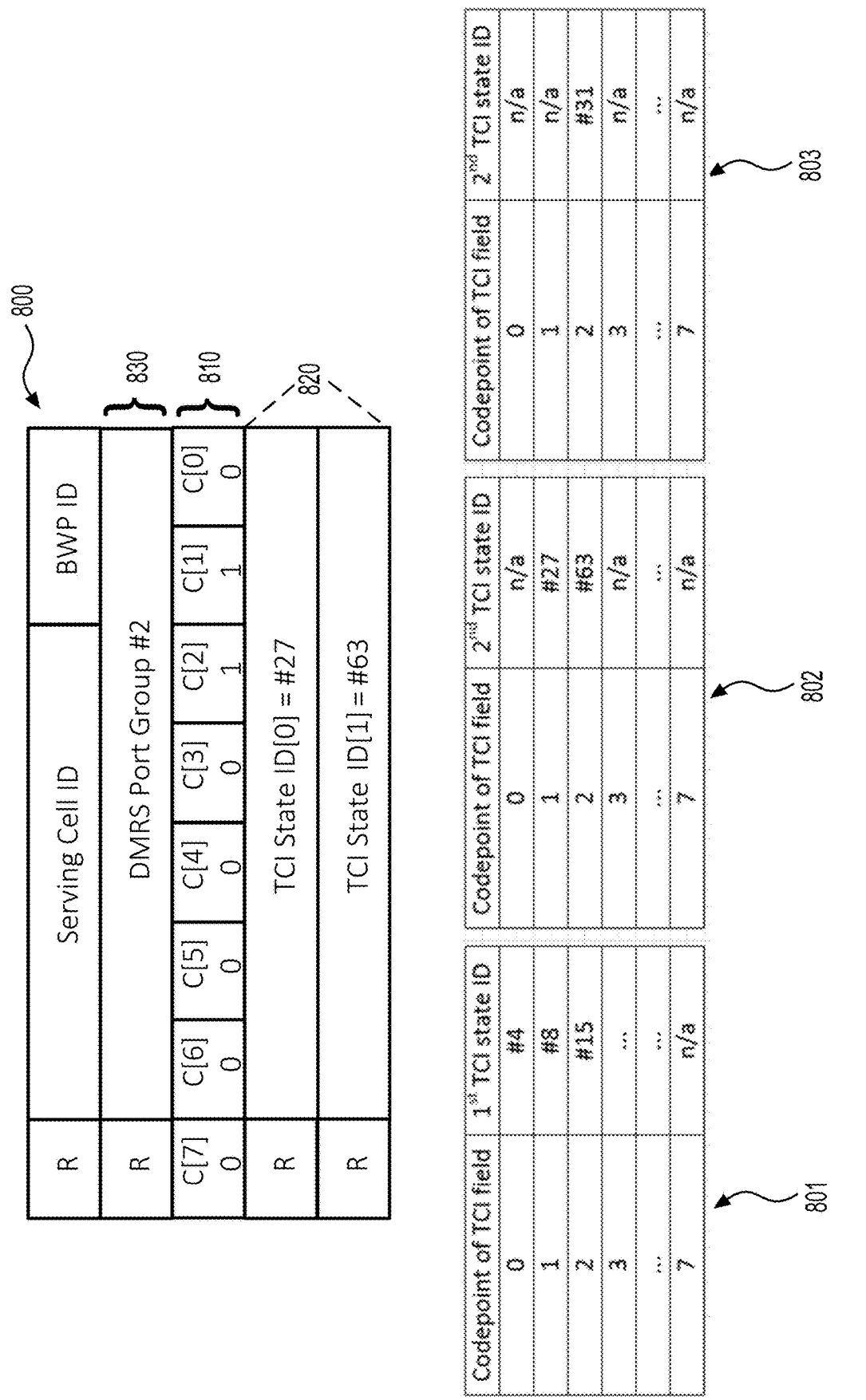
FIG. 8 shows another exemplary activation command for associating TCI states according to embodiments of the disclosure.

FIG. 8 shows another exemplary activation command 800 for associating TCI states according to embodiments of the disclosure. In FIG. 8, the UE 120 can be configured with three DMRS port groups for a PDSCH and M TCI states. To activate the three DMRS port groups at a same time, three sets of TCI states are mapped into the codepoints of a TCI field according to associations 801, 802, and 803, respectively. To differentiate the three associations, different activation commands can be employed. For example, a first activation command maps a first subset (e.g., N) of the M configured TCI states for the association 801, a second activation command maps a second subset (e.g., K1) of the M configured TCI states for the second association 802, and a third activation command maps a third subset (e.g., K2) of the M configured TCI states for the third association 803. Therefore, when the UE 120 receives a specific codepoint that indicates a first TCI state in the association 801, a second TCI state in the association 802, and a third TCI state in the association 803, the first TCI state, the second TCI state, and the third TCI state are provided for different DMRS port groups. For example, if the received codepoint is 2, the first TCI state applied to the first DMRS port group is #15, the second TCI state applied to the second DMRS port group is #63, and the third TCI state applied to the third DMRS port group is #31.

According to aspects of the disclosure, when the UE 120 is configured with more than two DMRS port groups for a PDSCH and M TCI states, the UE 120 can receive an activation command having a first type to activate one of the more than two DMRS port groups and can also receive one or multiple activation commands having a second type to activate other DMRS port groups at a same time. In an embodiment, each activation command is used to map a subset of the M TCI states for a respective association with codepoints. It is noted that the first type of activation command and the second type of activation command can have different formats or types.

In an embodiment, when both the first type and the second type of activation commands are MAC-CEs, the first type and the second type of activation commands can have different LCIDs. For example, the first type of activation command (e.g., MAC-CE) may use a same LCID (e.g., 53) defined in the table 410 while the second type of activation command (e.g., MAC-CE) may use a different LCID.

In an embodiment, the first type of activation command can be the same type as the activation command 300 and the second type of activation command can be the same type as the activation command 800. Similar to the activation command 600, the activation command 800 also includes a status selection field 810 for the codepoints and a TCI state ID field 820, and thus has a variable size. The selection status field 810 indicates the selection status of the codepoints and the TCI state ID field 820 contains TCI state IDs corresponding to the selected codepoints. Different from the activation command 600, the activation command 800 includes a DMRS port group field 830. The DMRS port group field 830 indicates a DMRS port group for which the activation command 800 applies. For example, a DMRS group field of a second activation command having the second type may indicate a second DMRS port group and a DMRS group field of a third activation command having the same second type may indicate a third DMRS group port. In the FIG. 8 example, the DMRS port group field 830 indicates a second DMRS port group.

Figure 9:
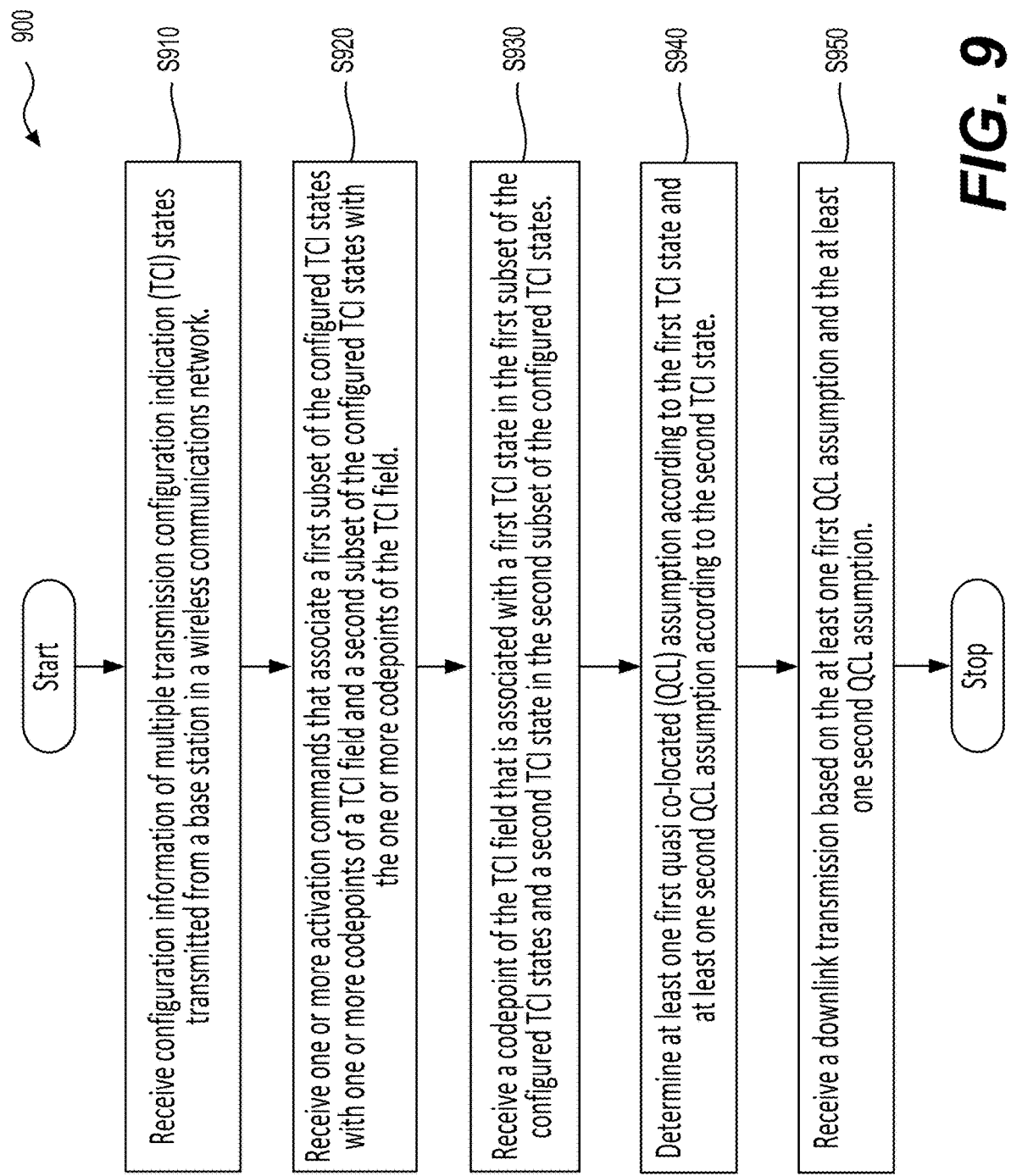
FIG. 9 shows a flowchart outlining an exemplary process according to embodiments of the disclosure.

FIG. 9 shows a flowchart outlining an exemplary process 900 according to embodiments of the disclosure. In various embodiments, the process 900 is executed by processing circuitry, such as the processing circuitry in the UE 120. In some embodiments, the process 900 is implemented in software instructions, thus when the processing circuitry executes the software instructions, the processing circuitry performs the process 900.

The process 900 may generally start at step S910, where the process 900 receives configuration information of multiple transmission configuration indication (TCI) states transmitted from a base station in a wireless communications network. Then the process 900 proceeds to step S920.

At step S920, the process 900 receives one or more activation commands that associate a first subset of the configured TCI states with one or more codepoints of a TCI field and a second subset of the configured TCI states with the one or more codepoints of the TCI field. Then the process 900 proceeds to step S930.

At step S930, the process 900 receives a codepoint of the TCI field that is associated with a first TCI state in the first subset of the configured TCI states and a second TCI state in the second subset of the configured TCI states. Then the process 900 proceeds to step S940.

At step S940, the process 900 determines at least one first quasi co-located (QCL) assumption according to the first TCI state and at least one second QCL assumption according to the second TCI state. Then the process 900 proceeds to step S950.

At step S950, the process 900 receives a downlink transmission based on the at least one first QCL assumption and the at least one second QCL assumption. Then the process 900 terminates.

In an embodiment, the downlink transmission is a physical downlink shared channel (PDSCH) transmission, and the TCI field is carried in a downlink control information (DCI) that schedules the PDSCH.

In an embodiment, the process 900 receives the downlink transmission by applying the at least one first QCL assumption to a first demodulation reference signal (DMRS) port group of the downlink transmission and the at least one second QCL assumption to a second DMRS port group of the downlink transmission.

In an embodiment, each of the configured TCI states is configured with at least one QCL information, and each of the at least one QCL information indicates a respective reference signal and at least one associated QCL type.

In an embodiment, one activation command associates the first subset of the configured TCI states to the one or more codepoints of the TCI field in DCI and the second subset of the configured TCI states to the one or more codepoints.

In an embodiment, the activation command includes a selection status field for the one or more codepoints of the TCI field and maps the first and second subsets of the configured TCI states to the one or more codepoints according to the selection status field.

In an embodiment, a first activation commands associates the first subset of the configured TCI states to the one or more codepoints of the TCI field and a second activation command associates the second subset of the configured TCI states to the one or more codepoints of the TCI field.

In an embodiment, the first activation command and the second activation command have different logical channel identifications (LCIDs).

In an embodiment, the second activation command includes a selection status field for the one or more codepoints of the TCI field and maps the second subset of the configured TCI states to the one or more codepoints according to the selection status field.

In an embodiment, the process 900 receives a third activation command having the same LCD with the second activation command, the third activation command associating a third subset of the configured TCI states to the one or more codepoints of the TCI field.

In an embodiment, the process 900 receives the codepoint that indicates at least one TCI state in the first subset, the second subset, and the third subset of the configured TCI states. According to the at least one TCI state associated to the codepoint, the process 900 determines the at least one QCL assumption for the first DMRS port group, the second DMRS port group, and a third DMRS port group.

In an embodiment, the second and third activation commands include a field indicating a DMRS port group.

This application also presents improvement techniques for uplink QCL framework.

According to aspects of the disclosure, the UE 120 can be configured with at least one sounding reference signal (SRS) resource set. Each of the at least one SRS resource set can have one or more SRS resources. The UE 120 can further receive an SRS resource indicator (SRI) for selecting a subset of the one or more SRS resources. According to the selected subset of the SRS resources, the UE 120 can determine a spatial QCL assumption for a physical uplink shared channel (PUSCH) transmission. In other words, the UE 120 can determine a transmission beam/panel for the PUSCH transmission.

In an embodiment, an SRS resource set can include an SRS resource set ID, at least one SRS resource, and a usage of the SRS resource set. Each of the at least one SRS resource can be one of three types: aperiodic, semi-persistent, and periodic. The usage of the SRS resource set can be one of four functions: beamManagement, codebook, non-Codebook, and antennaSwitching.

In an embodiment, an SRS resource can include a spatial relation information (SpatialRelationInfo) and the QCL assumption of the PUSCH transmission can be determined according to the spatial relation information of the selected SRS resource. The spatial relation information can include an RS index, such as an SSB index, a CSI-RS index, or an SRS index. The spatial relation information can include an optional serving cell ID.

In an embodiment, an SRS resource set can be configured through a higher layer parameter, such as RRC signaling. Further, a PUSCH transmission can be a codebook based transmission. That is, the usage of the selected SRS resource set is set to codebook. Additionally, an SRI can be carried in a field of downlink control information (DCI) that schedules a PUSCH transmission.

FIGS. 10A-10C show various exemplary sounding reference signal (SRS) resource set configurations according to embodiments of the disclosure. It is noted that the Rx beams 123-125 and 126-128 of the UE 120 in the FIG. 1 example can be used as Tx beams for uplink transmission in the following embodiments.

FIG. 10A shows an exemplary SRS resource set configuration including one SRS resource set 1000 according to an embodiment of the disclosure. The SRS resource set 1000 is configured with two SRS resources 1001 and 1002. In an embodiment, the two SRS resources 1001 and 1002 correspond to two Tx beams of a same antenna panel of the UE 120. For example, the two SRS resources 1001 and 1002 correspond to two Tx beam 123 and 124 of the antenna panel 121 of the UE 120, respectively. Accordingly, a 1-bit SRI 1003 can be used for selecting one of the two SRS resources 1001 and 1002. In the FIG. 10A example, when the SRI 1003 indicates '0', the SRS resource 1001 is selected. Otherwise, the SRS resource 1002 is selected. In addition, the usage of the SRS resource set 1000 is set to codebook.

FIG. 10B shows another exemplary SRS resource set configuration including one SRS resource set 1010 according to an embodiment of the disclosure. The SRS resource set 1010 is configured with three SRS resources 1011-1013. In an embodiment, the three SRS resources 1011-1013 correspond to three Tx beams of different antenna panels of the UE 120. For example, the SRS resource 1011 corresponds to the Tx beam 123 of the antenna panel 121 while other two SRS resources 1012 and 1013 correspond to the Tx beams 126 and 127 of the other antenna panel 122. Accordingly, a 3-bit SRI 814 can be used for selecting a subset of the three SRS resources 1011-1013. In the FIG. 10B example, for each antenna panel, a respective SRS resource is selected. When the 3-bit SRI 1014 indicates '101', the SRS resources 1011 and 1013 are selected for the antenna panels 121 and 122, respectively. That is, the Tx beams 123 and 127 are selected for the antenna panels 121 and 122, respectively.

In other embodiments, the SRS resource set can include more than three SRS resources and each of the SRS resources correspond to different Tx beams. These different Tx beams may be formed from a same antenna panel, or may be formed from different antenna panels if a UE is configured with multiple panels. In addition, an SRI including multiple bits is used for selecting a subset of the SRS resources. A number of the multiple bits is equal to a total number of the SRS resources included in the SRS resource set. For example, if the SRS resource set includes N SRS resources, the SRI can be an N-bit field and each bit corresponds to a respective SRS resource. The selected SRS resources may correspond to different beams of different antenna panels.

FIG. 10C shows another exemplary SRS resource set configuration including two SRS resource sets 1020 and 1030 according to an embodiment of the disclosure. Each SRS resource set is configured with two SRS resources. For example, the SRS resource set 1020 is configured with two SRS resources 1021 and 1022, while the SRS resource set 1030 is configured with two SRS resources 1031 and 1032.

In an embodiment, each SRS resource set corresponds to a respective antenna panel of the UE 120. For example, the SRS resource sets 1020 and 1030 can correspond to the antenna panels 121 and 122 of the UE 120, respectively. In addition, each SRS resource included in an SRS resource set can correspond to a respective Tx beam of an antenna panel that corresponds to the SRS resource set. For example, the SRS resources 1021 and 1022 of the SRS resource set 1020 can correspond to Tx beams 123 and 124 of the antenna panel 121, respectively. The SRS resources 1031 and 1032 of the SRS resource set 1030 can correspond to Tx beams 126 and 127 of the antenna panel 122, respectively. Accordingly, a 2-bit SRI 1023 can be used for selecting a subset of the four SRS resources, and each bit corresponds to a respective SRS resource set (e.g., a respective antenna panel). In the FIG. 10C example, for each antenna panel, a respective SRS resource is selected. The lower bit of the SRI 823 corresponds to the SRS resource set 1020 while the higher bit corresponds to the SRS resource set 1030. When the 2-bit SRI 1023 indicates '10', the SRS resources 1021 and 1032 are selected for the antenna panels 121 and 122, respectively. That is, the Tx beams 123 and 127 are selected for the antenna panels 121 and 122, respectively.

In other embodiments, an SRS resource set configuration can include more than two SRS resource sets and each of the SRS resource sets corresponds to a respective antenna panel of a UE. Each SRS resource set can include up to two SRS resource sets. Each SRS resource included in an SRS resource set can correspond to a respective Tx beam of an antenna panel that corresponds to the SRS resource set. In addition, an SRI including multiple bits is used for selecting a subset of the SRS resources. A number of the multiple bits is equal to a total number of the SRS resource sets. For example, if a UE is configured with N SRS resource sets, the SRI can be an N-bit filed and each bit corresponds to a respective SRS resource set. Since up to two SRS resources are available in each SRS resource set, a bit indicating '1' can be used to select one SRS resource and the bit indicating '0' can be used to select the other one SRS resource. The selected SRS resources may correspond to different beams of different antenna panels.

Figure 11:
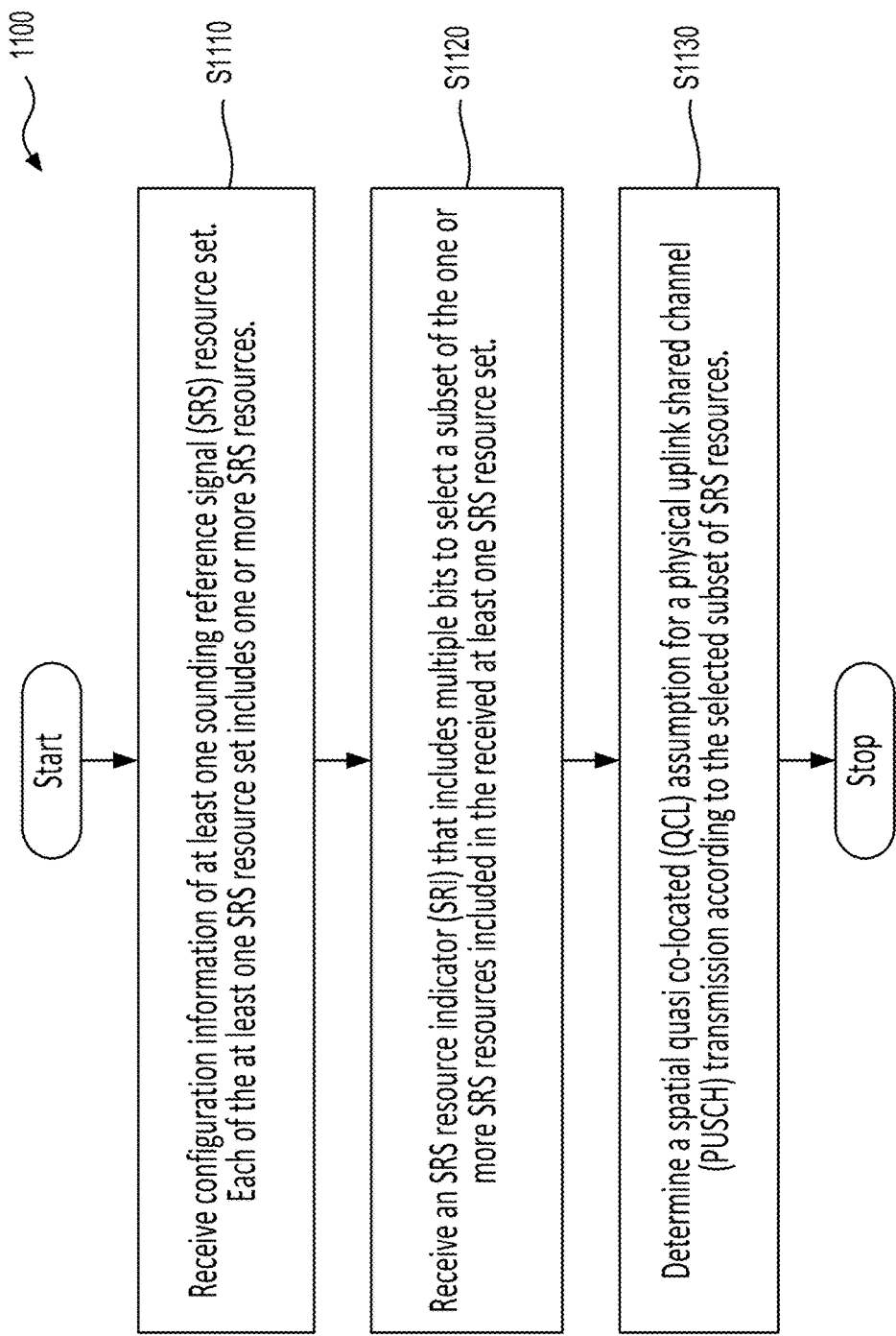
FIG. 11 shows a flowchart outlining an exemplary process according to embodiments of the disclosure.

FIG. 11 shows a flowchart outlining an exemplary process 1100 according to embodiments of the disclosure. In various embodiments, the process 1100 is executed by processing circuitry, such as the processing circuitry in the UE 120. In some embodiments, the process 1100 is implemented in software instructions, thus when the processing circuitry executes the software instructions, the processing circuitry performs the process 1100.

The process 1100 may generally start at step S1110, where the process 1100 receives configuration information of at least one sounding reference signal (SRS) resource set. Each of the at least one SRS resource set includes one or more SRS resources. Then the process 1100 proceeds to step S1120.

At step S1120, the process 1100 receives an SRS resource indicator (SRI) that includes multiple bits to select a subset of the one or more SRS resources included in the received at least one SRS resource set. Then the process proceeds to step S1130.

At step S1130, the process 1100 determines a spatial quasi co-located (QCL) assumption for a physical uplink shared channel (PUSCH) transmission according to the selected subset of SRS resources. Then the process 1100 terminates.

In an embodiment, the UE is configured with multiple antenna panels, and each of the multiple antenna panels includes a plurality of transmission beam information.

When one SRS resource set including a plurality of SRS resources is configured, each of the plurality of SRS resources included in the SRS resource set can correspond to one of the plurality of transmission beam information included in the multiple antenna panels.

Additionally, a number of the multiple bits included in the SRI can be equal to a number of the plurality of SRS resources included in the SRS resource set, and each of the multiple bits corresponds to a respective SRS resource.

In an embodiment, when multiple SRS resource sets are configured, each SRS resource set corresponds to a respective antenna panel of the UE.

When each of the multiple SRS resource sets includes up to two SRS resources, the number of the multiple bits included in the SRI can be equal to a number of the multiple SRS resource sets, and each of the multiple bits corresponds to a respective SRS resource set.

In an embodiment, each of the one or more SRS resources includes a respective spatial relation information, and the spatial QCL assumption of the PUSCH transmission is determined according to the spatial relation information of the selected subset of SRS resources. The PUSCH transmission can be a codebook based transmission.

The configuration information of the one or more SRS resource sets can be received via a radio resource control (RRC) message.

In an embodiment, the SRI is received in a field of downlink control information (DCI) scheduling the PUSCH transmission.

Figure 12:
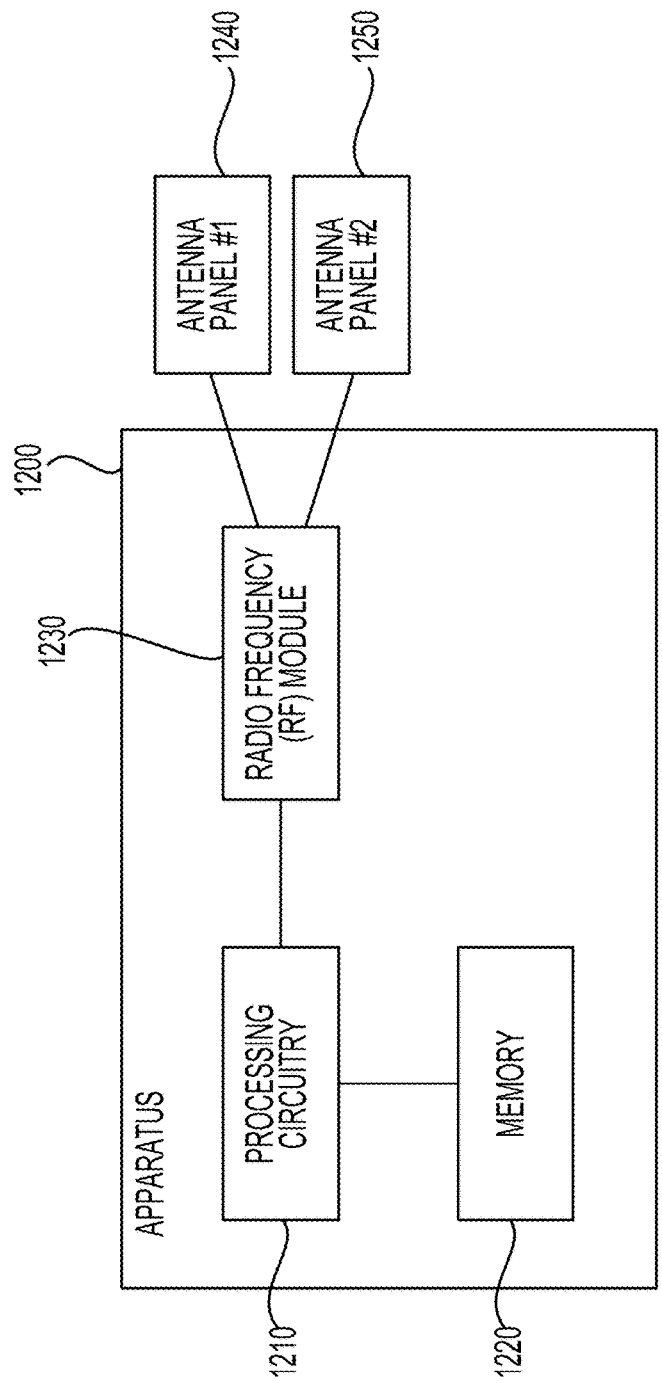
FIG. 12 shows an exemplary apparatus according to embodiments of the disclosure.

FIG. 12 shows an exemplary apparatus 1200 according to embodiments of the disclosure. The apparatus 1200 can be configured to perform various functions in accordance with one or more embodiments or examples described herein. Thus, the apparatus 1200 can provide means for implementation of techniques, processes, functions, components, systems described herein. For example, the apparatus 1200 can be used to implement functions of the UE 120 or a combination of the BS 110 and the TRPs 111 and 112 in various embodiments and examples described herein. The apparatus 1200 can include a general purpose processor or specially designed circuits to implement various functions, components, or processes described herein in various embodiments. The apparatus 1200 can include processing circuitry 1210, a memory 1220, and a radio frequency (RF) module 1230.

In various examples, the processing circuitry 1210 can include circuitry configured to perform the functions and processes described herein in combination with software or without software. In various examples, the processing circuitry 1210 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1210 can be a central processing unit (CPU) configured to execute program instructions to perform various functions and processes described herein. Accordingly, the memory 1220 can be configured to store program instructions. The processing circuitry 1210, when executing the program instructions, can perform the functions and processes. The memory 1220 can further store other programs or data, such as operating systems, application programs, and the like. The memory 1220 can include a read only memory (ROM), a random access memory (RAM), a flash memory, a solid state memory, a hard disk drive, an optical disk drive, and the like.

The RF module 1230 receives a processed data signal from the processing circuitry 1210 and converts the data signal to beamforming wireless signals that are then transmitted via antenna panels 1240 and/or 1250, or vice versa. The RF module 1230 can include a digital to analog convertor (DAC), an analog to digital converter (ADC), a frequency up convertor, a frequency down converter, filters and amplifiers for reception and transmission operations. The RF module 1230 can include multi-antenna circuitry for beamforming operations. For example, the multi-antenna circuitry can include an uplink spatial filter circuit, and a downlink spatial filter circuit for shifting analog signal phases or scaling analog signal amplitudes. Each of the antenna panels 1240 and 1250 can include one or more antenna arrays.

In an embodiment, part of all the antenna panels 1240/1250 and part or all functions of the RF module 1230 are implemented as one or more TRPs, and the remaining functions of the apparatus 1200 are implemented as a BS. Accordingly, the TRPs can be co-located with such a BS, or can be deployed away from the BS.

The apparatus 1200 can optionally include other components, such as input and output devices, additional or signal processing circuitry, and the like. Accordingly, the apparatus 1200 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for configuring user equipment (UE), the method comprising: receiving configuration information of multiple transmission configuration indication (TCI) states transmitted from a base station in a wireless communications network; receiving an activation command that specifies a first association between a first subset of the configured TCI states and first one or more codepoints of a TCI field and a second association between a second subset of the configured TCI states and second one or more codepoints of the TCI field, the activation command including a selection status field identifying the first one or more codepoints of the TCI field and the second one or more codepoints of the TCI field, and a TCI state mapping field identifying the first subset of the configured TCI states and the second subset of the configured TCI states with respect to the first one or more codepoints and the second one or more codepoints identified in the selection status field; receiving a signaled codepoint of the TCI field that is associated with a first indicated TCI state in the first subset of the configured TCI states according to the first association and a second indicated TCI state in the second subset of the configured TCI states according to the second association; determining at least one first quasi co-located (QCL) assumption according to the first indicated TCI state and at least one second QCL assumption according to the second indicated TCI state; and receiving a downlink transmission based on the at least one first QCL assumption and the at least one second QCL assumption.

2. The method of claim 1, wherein the downlink transmission is a physical downlink shared channel (PDSCH) transmission, and the signaled codepoint of the TCI field is carried in a downlink control information (DCI) that schedules the PDSCH.

3. The method of claim 1, wherein the receiving the downlink transmission further includes: receiving the downlink transmission by applying the at least one first QCL assumption to a first demodulation reference signal (DMRS) port group of the downlink transmission and the at least one second QCL assumption to a second DMRS port group of the downlink transmission.

4. The method of claim 1, wherein each of the configured TCI states is configured with at least one piece of QCL information, and each of the at least one piece of QCL information indicates a respective reference signal and at least one associated QCL type.

5. The method of claim 1, further comprising: receiving a third another activation command that specifies a third association between a third subset of the configured TCI states and third one or more codepoints of the TCI field.

6. The method of claim 5, wherein the signaled codepoint is further associated with a third indicated TCI state in the third subset of the configured TCI states according to the third association, and the method further comprises: determining the at least one first QCL assumption for a first demodulation reference signal (DMRS) port group according to the first indicated TCI state, the at least one second QCL assumption for a second DMRS port group according to the second indicated TCI state, and at least one third QCL assumption for a third DMRS port group according to the third indicated TCI state.

7. The method of claim 5, wherein the another activation command includes a field indicating a demodulation reference signal (DMRS) port group.

8. A user equipment (UE), comprising circuitry configured to: receive configuration information of multiple transmission configuration indication (TCI) states transmitted from a base station in a wireless communications network; receive an activation command that specifies a first association between a first subset of the configured TCI states and first one or more codepoints of a TCI field and a second association between a second subset of the configured TCI states and second one or more codepoints of the TCI field, the activation command including a selection status field identifying the first one or more codepoints of the TCI field and the second one or more codepoints of the TCI field, and a TCI state mapping field identifying the first subset of the configured TCI states and the second subset of the configured TCI states with respect to the first one or more codepoints and the second one or more codepoints identified in the selection status field; receive a signaled codepoint of the TCI field that is associated with a first indicated TCI state in the first subset of the configured TCI states according to the first association and a second indicated TCI state in the second subset of the configured TCI states according to the second association; determine at least one first quasi co-located (QCL) assumption according to the first indicated TCI state and at least one second QCL assumption according to the second indicated TCI state; and receive a downlink transmission based on the at least one first QCL assumption and the at least one second QCL assumption.

9. The UE of claim 8, wherein the downlink transmission is a physical downlink shared channel (PDSCH) transmission, and the signaled codepoint of the TCI field is carried in a downlink control information (DCI) that schedules the PDSCH.

10. The UE of claim 8, wherein the circuitry is further configured to: receive the downlink transmission by applying the at least one first QCL assumption to a first demodulation reference signal (DMRS) port group of the downlink transmission and the at least one second QCL assumption to a second DMRS port group of the downlink transmission.

11. The UE of claim 8, wherein each of the configured TCI states is configured with at least one piece of QCL information, and each of the at least one piece of QCL information indicates a respective reference signal and at least one associated QCL type.

12. A non-transitory computer-readable storage medium storing a program executable by at least one processor to perform: receiving configuration information of multiple transmission configuration indication (TCI) states transmitted from a base station in a wireless communications network;

receiving an activation command that specifies a first association between a first subset of the configured TCI states and first one or more codepoints of a TCI field and a second association between a second subset of the configured TCI states and second one or more codepoints of the TCI field, the activation command including a selection status field identifying the first one or more codepoints of the TCI field and the second one or more codepoints of the TCI field, and a TCI state mapping field identifying the first subset of the configured TCI states and the second subset of the configured TCI states with respect to the first one or more codepoints and the second one or more codepoints identified in the selection status field; receiving a signaled codepoint of the TCI field that is associated with a first indicated TCI state in the first subset of the configured TCI states according to the first association and a second indicated TCI state in the second subset of the configured TCI states according to the second association; determining at least one first quasi co-located (QCL) assumption according to the first indicated TCI state and at least one second QCL assumption according to the second indicated TCI state; and receiving a downlink transmission based on the at least one first QCL assumption and the at least one second QCL assumption.

13. The non-transitory computer-readable storage medium of claim 12, wherein the downlink transmission is a physical downlink shared channel (PDSCH) transmission, and the signaled codepoint of the TCI field is carried in a downlink control information (DCI) that schedules the PDSCH.

14. The non-transitory computer-readable storage medium of claim 12, wherein the receiving the downlink transmission further includes:

receiving the downlink transmission by applying the at least one first QCL assumption to a first demodulation reference signal (DMRS) port group of the downlink transmission and the at least one second QCL assumption to a second DMRS port group of the downlink transmission.

15. The non-transitory computer-readable storage medium of claim 12, wherein each of the configured TCI states is configured with at least one piece of QCL information, and each of the at least one piece of QCL information indicates a respective reference signal and at least one associated QCL type.

* * * * *